C. WACKER.
FISH CUTTING MACHINE.
APPLICATION FILED MAR. 24, 1911.
1,000,648.
Patented Aug. 15, 1911.
2 SHEETS—SHEET 1.
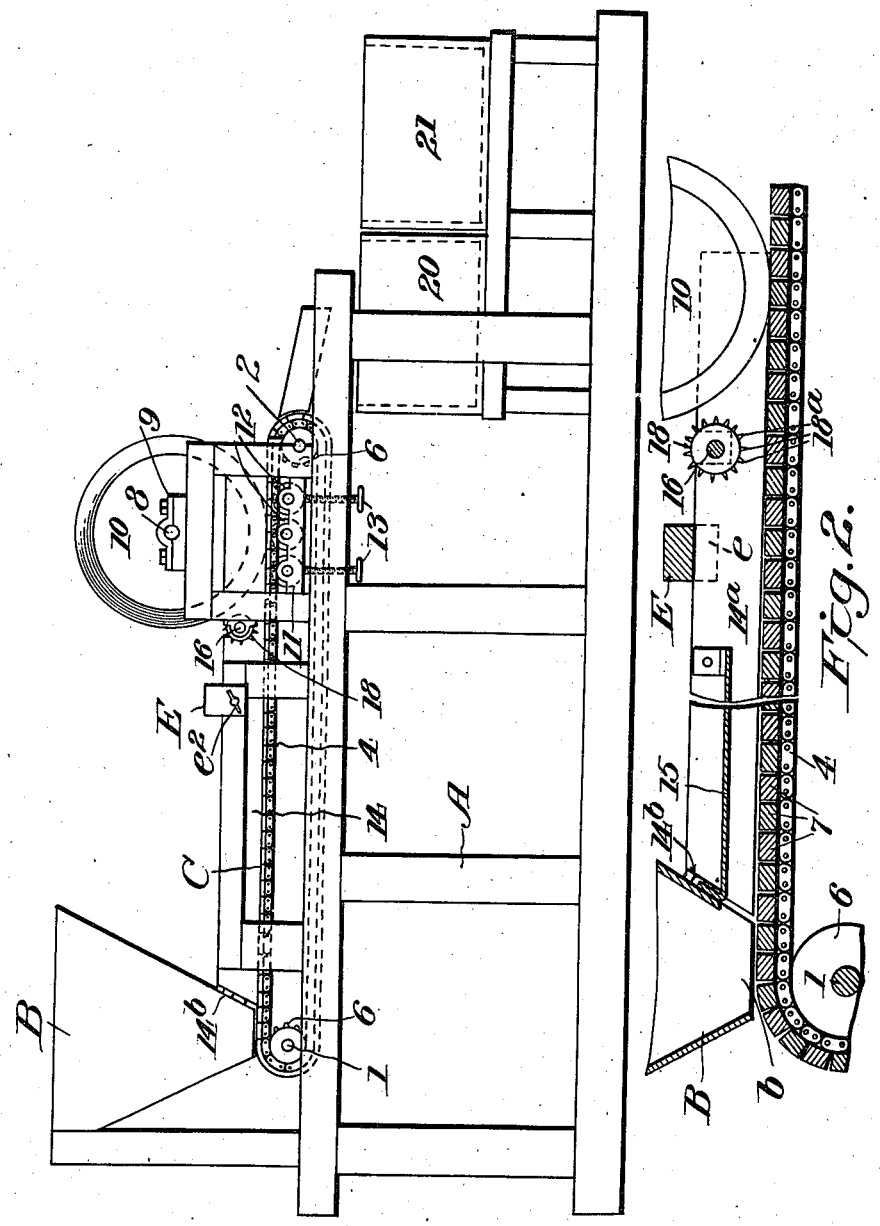
WITNESSES
INVENTOR
Charles Wacker
By Watson & Boyden
Attorneys C. WACKER.
FISH CUTTING MACHINE.
APPLICATION FILED MAR. 24, 1911.
1,000,648.
Patented Aug. 15, 1911.
2 SHEETS—SHEET 2.
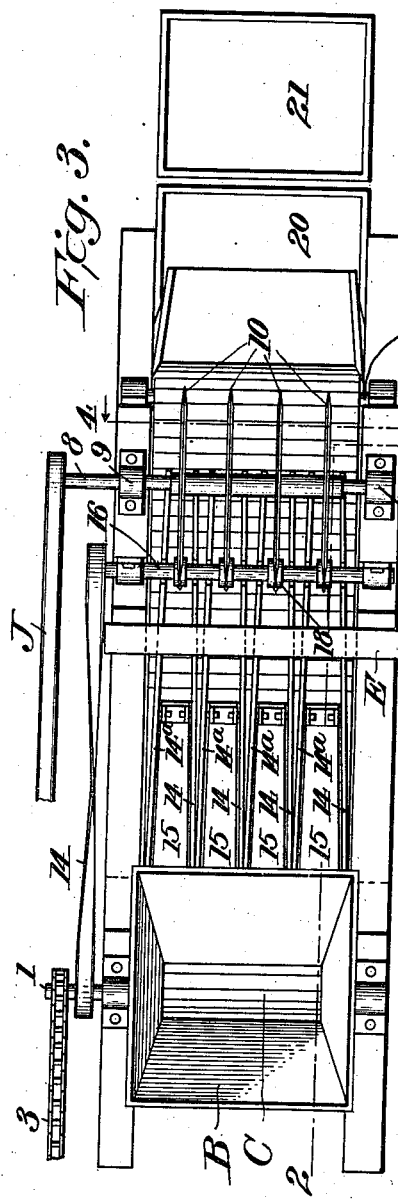
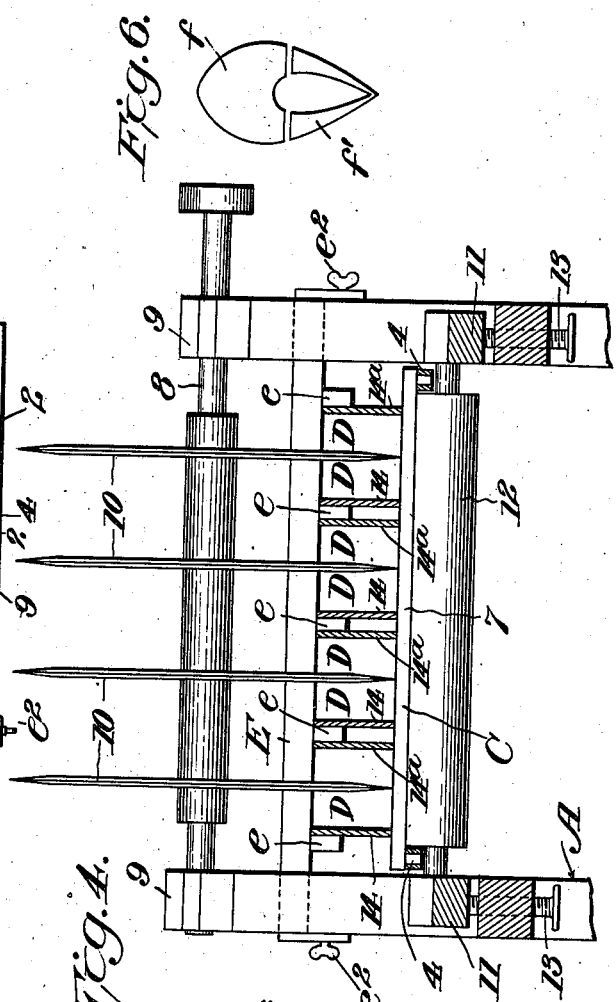
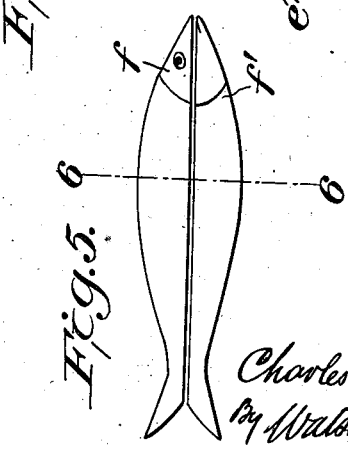
WITNESSES
INVENTOR
Charles Wacker
By Watson & Boyden
Attorneys

UNITED STATES PATENT OFFICE.

CHARLES WACKER, OF BYRDTON, VIRGINIA.

FISH-CUTTING MACHINE.

1,000,648.     Specification of Letters Patent.     Patented Aug. 15, 1911.

Application filed March 24, 1911. Serial No. 616,680.

*To all whom it may concern:*

Be it known that I, CHARLES WACKER, a citizen of the United States, residing at Byrdton, in the county of Northumberland and State of Virginia, have invented certain new and useful Improvements in Fish-Cutting Machines, of which the following is a specification.

In the spawning season, herring and other food fish arrive in the rivers and bays in great numbers, but, owing principally to the scarcity of labor, they cannot be advantageously handled so as to save the fish for food purposes.

It is the purpose of my invention to provide a machine whereby the fish will be split lengthwise just below the backbone so that the roe and milt may be readily removed from the lower or belly portion of the fish, and these parts, as well as the other edible portions of the fish, may be utilized for canning purposes.

In the accompanying drawing, which illustrates my invention, Figure 1 is a side elevation of a machine for severing fish; Fig. 2 is a vertical longitudinal section through a portion of the same, partly broken away, taken on the line 2—2 of Fig. 3; Fig. 3 is a top plan view of the machine; Fig. 4 is a cross section on the line 4—4 of Fig. 3; Fig. 5 is a side view of a fish separated into two parts by the machine; and, Fig. 6 is a section through the body of the fish on the line 6—6 of Fig. 5.

Referring to the drawing and particularly to Figs. 1 to 4, inclusive, A indicates a suitable frame, upon one end of which is mounted a suitable hopper B for receiving the fish. An endless conveyer C is mounted upon shafts 1 and 2 journaled near the ends of the frame. The shaft 1 is the drive shaft of the machine, the power from the prime mover being transmitted to the shaft by suitable means such as the sprocket chain 3.

The conveyer C comprises a pair of sprocket chains 4—4 passing around suitable sprocket wheels 6 on the shafts 1 and 2, and wooden slats 7 having their ends suitably connected to the sprocket chains, and forming the floor of the conveyer. Above the conveyer, and at the opposite end from the hopper, is arranged a shaft 8, extending from side to side of the frame and journaled thereon in suitable bearings 9. Upon this shaft are arranged circular knives or cutters 10 which extend down practically into contact with the wooden slats 7 of the conveyer. These knives are preferably secured to the shaft 8 and the latter driven at suitable speed by suitable means, such as the belt J, the shaft turning in the direction to cause the lower edges of the knives to travel in the same direction as the conveyer. Instead of driving the shaft and knives from the prime mover, the knives may be loosely mounted on the shaft, so that each will turn independently, in which case the fish passing along on the conveyer under the knives will turn the latter.

The portion of the conveyer which is immediately below the knives is adjustable vertically by means of a roller frame 11, carrying rollers 12 which bear against the under side of the conveyer, and adjusting devices, such as the screws 13, mounted in the main frame and supporting the roller frame. By proper adjustment the slats of the conveyer will run practically in contact with the knives.

A series of partitions 14, 14$^a$, which form guides, are connected to the hopper by hinges 14$^b$, one of which is shown in Fig. 1, these hinges allowing the guides to swing laterally. The guides extend from the hopper to a point about in line with the shaft 8, or a little beyond, and the rear ends of the guides rest upon the conveyer. When the conveyer is in motion it tends to hold the guides parallel with one another and with the planes of the knives. There is a guide 14 at one side of each knife and a guide 14$^a$ at the opposite side, each pair of guides forming a channel D for guiding the fish from the hopper to the knives. These channels may be made to converge toward the knives by means of an adjustable bar E having wedges $e$ projecting downwardly from its under side and adapted to bear against the outer sides of each pair of guides. This bar is adjustable lengthwise of the main frame and may be secured in any desired position by means of clamping screws $e^2$. The adjustment of the wedge bar toward the hopper causes the free ends of the guides for each channel to move toward one another, or converge toward the knives, while a movement of the wedge bar in the opposite directions permits the guides to swing farther apart. Thus the channels may be varied in width to suit the width of the fish being operated upon, and the convergence of the guides assists in adjusting the fish so that when they reach the knives they will lie endwise, on their sides in the channels. The knives are located midway between the guides, and this relation is not disturbed by the adjustment of the wedge bar to vary the widths of the channels, as will be evident.

The hopper B has an opening $b$ through which the fish may pass on to the conveyer, and at the rear of the hopper, in each channel, is a strick 15 arranged at such a height as to prevent the fish from piling up on to conveyer and to cause them to pass singly to the knives. As the fish have some distance to travel in the converging channels, before reaching the knives, they will, upon reaching the knives, be arranged endwise, in single file, and lying on their sides when they pass under the knives.

Any suitable form of device may be provided for preventing the fish from slipping backward relatively to the conveyer floor when they are engaged by the knives, such, for instance, as a pawl; but I prefer to use a positive feeding device for engaging the fish. Between the strick and the knives, and close to the latter, is a feed shaft 16, journaled in suitable bearings at the sides of the main frame, and connected by a cross-belt 17 to the main shaft 1. Upon this feed shaft are secured feed wheels 18, one feed wheel within each channel, these wheels preferably being provided with small teeth or projections $18^a$. The feed shaft is driven at a speed such that the peripheries of the feed wheels will travel at about the same speed as the conveyer, and the feed wheels are arranged close enough to the conveyer to engage the fish and hold them positively against backward movement, or slippage, while they are passing into engagement with the knives.

In operation the wedge bar is adjusted so as to adjust the channels to the size of the fish to be cut. The fish, dumped into the hopper B, pass through the opening therein onto the conveyer and thence are carried through the channels. The channels converging toward the knives, and the width of the channels adjacent to the hopper being such that fish can only enter endwise therein, and the strick preventing the fish from lying one on top of the other, they will, by the time they reach the feed wheels, be arranged in single file, lying upon their sides, and lengthwise of the channels. When carried under the knives, the latter will split the fish longitudinally and practically on a central line, as illustrated in Figs. 5 and 6, wherein $f$ indicates the upper half of the fish and $f'$ the lower half. As shown in Fig. 6 the cavity, containing the entrails and roe, is mainly in the lower half of the fish. After passing the knives, the lower half of the fish is picked up by an attendant and the roe or milt removed and utilized for canning purposes. The lower half of the fish is of little or no value for food purposes, but the upper half, when the head and tail portions are removed is valuable for food purposes and this portion of the fish may be canned.

In the drawing, 20 and 21 indicate receptacles which may be used for holding different parts of the fish.

What I claim is:—

1. In a fish cutting machine, a traveling conveyer, a knife above the conveyer, and means for feeding fish endwise on their sides to said knife, comprising a feed hopper, stationary guides, forming a channel extending from the feed hopper to the knife, said knife being arranged approximately midway between said guides, a device in advance of the knife for preventing fish from slipping backward relatively to the conveyer when engaged by the knife and a strick arranged in each channel between the hopper and the feed wheel.

2. In a fish cutting machine, a traveling conveyer, a feed hopper at one end of the conveyer and knives at the opposite end thereof, guides hinged adjacent to the hopper so as to swing laterally and extending to the knives, said guides forming channels extending from the hopper to the knives, and means for adjusting the free ends of said guides laterally.

3. In a fish cutting machine, a traveling conveyer, a feed hopper at one end of the conveyer and knives at the opposite end thereof, guides hinged adjacent to the hopper so as to swing laterally and extending to the knives, said guides forming channels extending from the hopper to the knives, and means for adjusting the free ends of said guides laterally comprising a bar adjustable lengthwise of the guides and having projections thereon adapted to bear against the sides of the guides, and means for securing said bar in various positions.

4. In a fish cutting machine, a traveling conveyer, a feed hopper at one end of the conveyer and knives at the opposite end thereof, guides each hinged at one end adjacent to the hopper so as to permit its free end to swing laterally, said free ends resting upon the conveyer, said guides forming channels extending from the hopper to the knives, and means for adjusting the free ends of said guides laterally.

5. In a fish cutting machine, a conveyer comprising an endless traveling floor, guides, forming channels, above said floor, a shaft arranged transversely of the conveyer and having circular knives thereon adapted to engage said floor, one knife midway between the sides of each channel, and means for adjusting said floor toward and from the knives.

In testimony whereof I affix my signature, in presence of two witnesses.

CHARLES WACKER.

Witnesses:
W. A. HASTINGS,
HARRY WATERS.